United States Patent
D'Angelo et al.

(10) Patent No.: US 10,382,910 B2
(45) Date of Patent: Aug. 13, 2019

(54) WIRELESS TRANSFER PROTOCOL FOR ELECTRONIC CERTIFICATES

(71) Applicant: Accenture Global Services Limited, Dublin (IE)

(72) Inventors: Giovanni D'Angelo, Rome (IT); Piergiorgio Rettaroli, Rome (IT); Salvatore Gifuni, Rome (IT); Fabio Mungo, Rome (IT)

(73) Assignee: Accenture Global Services Limited, Dublin (IE)

( * ) Notice: Subject to any disclaimer, the term of this patent is extended or adjusted under 35 U.S.C. 154(b) by 238 days.

(21) Appl. No.: 15/141,957

(22) Filed: Apr. 29, 2016

(65) Prior Publication Data

US 2016/0373882 A1    Dec. 22, 2016

Related U.S. Application Data

(63) Continuation-in-part of application No. 12/422,675, filed on Apr. 13, 2009, now abandoned.

(30) Foreign Application Priority Data

Feb. 16, 2009   (EP) .................................. 09 425 963

(51) Int. Cl.
  *H04W 4/18*       (2009.01)
  *H04W 4/14*       (2009.01)
  (Continued)

(52) U.S. Cl.
  CPC ............ *H04W 4/14* (2013.01); *G06Q 20/327* (2013.01); *G06Q 20/3278* (2013.01);
  (Continued)

(58) Field of Classification Search
  USPC ......................................................... 705/14
  See application file for complete search history.

(56) References Cited

U.S. PATENT DOCUMENTS

| | | |
|---|---|---|
| 6,487,180 B1 | 11/2002 | Borgstahl et al. |
| 6,587,835 B1 | 7/2003 | Treyz et al. |
| (Continued) | | |

FOREIGN PATENT DOCUMENTS

| | | |
|---|---|---|
| CN | 101351809 A | 1/2009 |
| EP | 1 030 273 A2 | 8/2000 |
| (Continued) | | |

OTHER PUBLICATIONS

App. No. EP 09 425 063, European Search Report dated Jun. 16, 2009, 5 pages.

(Continued)

*Primary Examiner* — Eric R Netzloff
*Assistant Examiner* — Dipen M Patel
(74) *Attorney, Agent, or Firm* — Brinks Gilson & Lione

(57) ABSTRACT

An electronic certificate system facilitates the secure application of certificates against wireless data transfers with a distributer system by a device user. A certificate enabled device carried by the user stores electronic certificates in memory. When the distributer system detects a certificate enabled device within a proximity radio frequency field, the distributer system queries and obtains applicable certificates for the user from the certificate enabled device carried by the user, applies the certificates to a data transfer, and securely communicates the resulting data transfer metadata back to the certificate enabled device.

9 Claims, 9 Drawing Sheets

(51) Int. Cl.
*H04L 29/08* (2006.01)
*G06Q 20/32* (2012.01)
*G06Q 20/38* (2012.01)
*G06Q 30/02* (2012.01)
*H04W 4/50* (2018.01)
*H04W 12/08* (2009.01)

(52) U.S. Cl.
CPC ........... *G06Q 20/387* (2013.01); *G06Q 30/02* (2013.01); *G06Q 30/0238* (2013.01); *H04L 67/22* (2013.01); *H04W 4/18* (2013.01); *H04W 4/50* (2018.02); *H04W 12/08* (2013.01)

(56) References Cited

U.S. PATENT DOCUMENTS

| | | | |
|---|---|---|---|
| 7,024,205 | B1 | 4/2006 | Hose |
| 2002/0042753 | A1 | 4/2002 | Ortiz et al. |
| 2003/0074259 | A1 | 4/2003 | Slyman, Jr. et al. |
| 2003/0233276 | A1 | 12/2003 | Pearlman et al. |
| 2003/0236712 | A1 | 12/2003 | Antonucci et al. |
| 2004/0243519 | A1 | 12/2004 | Perttila et al. |
| 2005/0131761 | A1 | 6/2005 | Trika et al. |
| 2007/0203792 | A1* | 8/2007 | Rao ........................ G06Q 20/20 705/14.35 |
| 2007/0288313 | A1* | 12/2007 | Brodson ................. G06Q 20/20 705/14.17 |
| 2008/0097855 | A1* | 4/2008 | Rissanen .............. G06Q 20/327 705/14.64 |
| 2008/0208688 | A1* | 8/2008 | Byerley ................. G06Q 30/02 705/14.39 |
| 2008/0299904 | A1 | 12/2008 | Yi et al. |
| 2009/0018964 | A1* | 1/2009 | Liu ........................ G06Q 20/02 705/76 |
| 2009/0061884 | A1* | 3/2009 | Rajan ................. G06Q 30/0225 455/445 |
| 2009/0099929 | A1 | 4/2009 | Thibedeau et al. |
| 2009/0106115 | A1* | 4/2009 | James .................... G06Q 20/10 705/14.26 |
| 2009/0222329 | A1* | 9/2009 | Ramer .............. G06F 17/30749 705/14.52 |
| 2009/0307080 | A1* | 12/2009 | Jain ........................ G06Q 30/02 705/14.38 |
| 2009/0307139 | A1* | 12/2009 | Mardikar ........... G06Q 20/1085 705/67 |

FOREIGN PATENT DOCUMENTS

| | | |
|---|---|---|
| EP | 1 197 929 A2 | 4/2002 |
| WO | WO 2005/083640 A1 | 9/2005 |
| WO | WO 2006/031202 A1 | 3/2006 |
| WO | WO 2007/030480 A2 | 3/2007 |
| WO | WO 2008/083105 A2 | 7/2008 |
| WO | WO 2008/157806 A2 | 12/2008 |

OTHER PUBLICATIONS

App. No. EP 09 425 063.6, European Examination Report dated Sep. 14, 2011, 7 pages.

Wikipedia, the free encyclopedia, Near Field Communication, Oct. 13, 2010, pp. 1-6, http://en.wikipedia.org/wiki/Near_Field_Communication.

English translation of Chinese Application No. 201010119667.5, Office Action dated Sep. 3, 2013, pp. 1-5.

* cited by examiner

WIRELESS TRANSFER PROTOCOL FOR ELECTRONIC CERTIFICATES

This application claims priority to and is a continuation-in-part of U.S. application Ser. No. 12/422,675, filed Apr. 13, 2009.

TECHNICAL FIELD

This disclosure relates to electronic certificate processing systems. The disclosure also relates to systems and protocols for wireless data transfers.

BACKGROUND

In recent years, the market for systems to support electronic wireless data transfer between interoperating devices has grown rapidly. Concurrently, mobile devices such as smartphones have become common place. Systems that increase the security, reliability, speed, and accuracy of wireless data transfer between devices will continue to expand the capabilities of such devices.

DETAILED DESCRIPTION

Wireless data transfers between multiple parties may be subject to verification. In one form of verification, the multiple parties may acknowledge the data transfer as valid. In some cases, electronic certificates may accompany the data transfers to cause alteration of metadata, for example, values for one or more cost metrics, of the data transfer. A secure protocol may wirelessly distribute the electronic certificates among potential parties to ensure that the parties may mutually verify the use of the electronic certificate before agreeing to alter the metadata.

Figure 1:
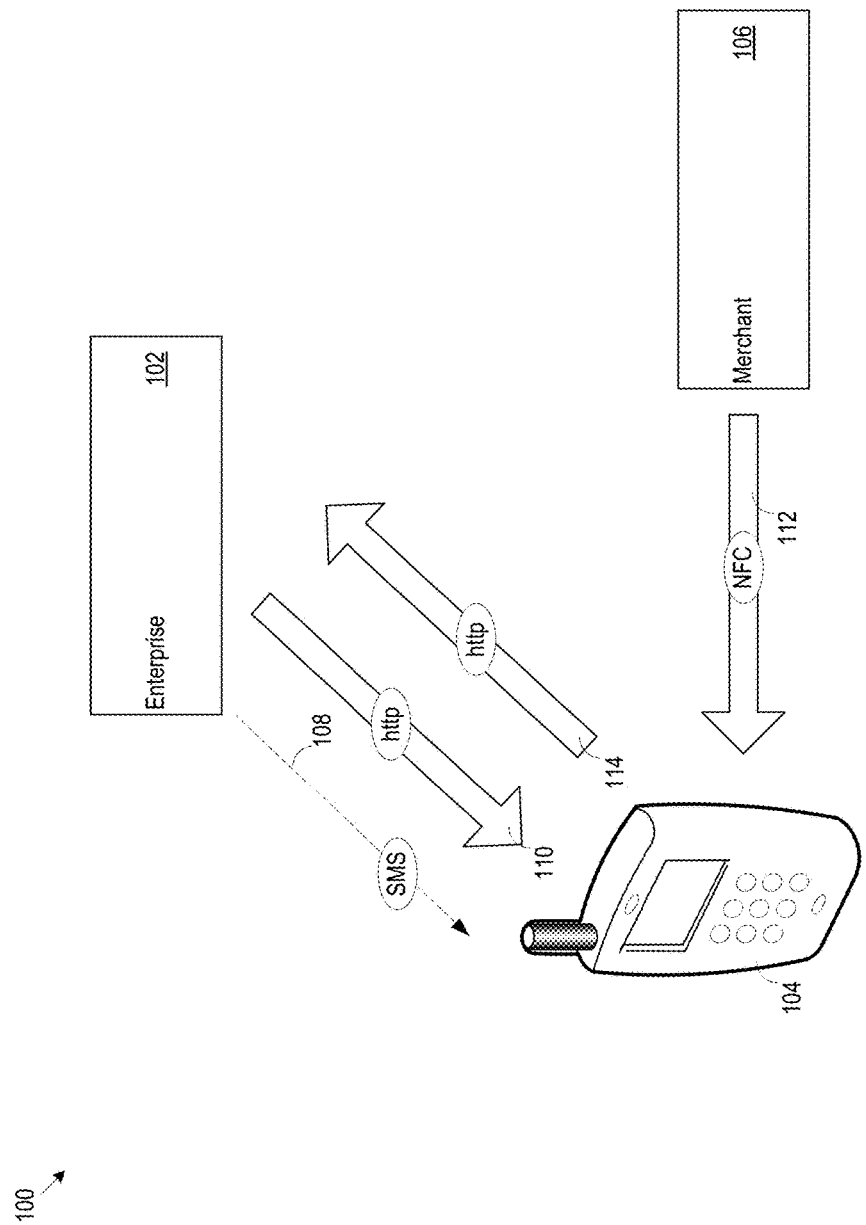
FIG. 1 shows an example electronic certificate environment for distribution and exchange.

FIG. 1 shows the entities that interact in an electronic certificate environment 100. The environment includes an enterprise system 102, an electronic certificate mobile device 104, and an electronic certificate distributer system 106. The electronic certificate mobile device 104 supports wireless data transfer of electronic certificates with the enterprise system 102 and the distributer system 106, and may, for instance, be a cellular phone on which is installed an electronic certificate subscriber application that facilitates processing and using the electronic certificates on the user end of data transfers. The mobile device 104 is not limited to cell phones, but may be virtually any portable electronic device, including a pager, portable game system, personal data assistant, music player, or other portable device. The electronic certificate distributer system 106 may be a mobile device or countertop-mounted device on which is installed an electronic certificate distributer application that facilitates processing electronic certificates on the distributer end of data transfers. The distributer system 106 may also be a part of or be connected to an electronic device for calculating and recording data transfers, for example recording metadata of the data transfer.

The enterprise system 102 may include an enterprise application that aids in the creation of electronic certificates, as well as their assignment to the electronic certificate mobile device 104. The enterprise system 102 may be a desktop, handheld, or other network computing device.

The electronic certificate mobile device 104 allows a user to maintain a paperless set of certificates and apply those certificates to data transfers in real time using contactless communication interfaces. The electronic certificates may include secure protocol messages, data transfer values, or other features. In some cases, the electronic certificates may represent meal tickets, percentage or fixed discount coupons, fidelity card services, promotional or direct advertising content, travel vouchers or tickets, or other electronic certificates worth a certain value, percentage, or discount in purchasing goods and services.

The mobile device 104 and distributer system 106 are each equipped with proximity communication interfaces to facilitate proximity communication between the mobile device 104 and distributer system 106. The proximity communication interfaces may be, for example, near field communication (NFC) interfaces. Such interfaces support localized wireless bi-directional communication capability over a relatively short range, such as 0-10 cm, though other ranges may also be employed. The mobile device 104 and distributer system 106 may alternatively be equipped with communication interfaces that utilize Bluetooth, radio-frequency identification (RFID), infrared data association (IrDa), WiFi, or other proximity communication technologies.

The proximity communication interface of the distributer system 106 may be a camera (e.g., digital camera) for capturing a barcode image or other optical machine-readable representation of data displayed on the mobile device 104. The barcode may be a linear, 2D (such as QR code), or other type of barcode representing data associated with the electronic certificate to be transferred to the distributer. The proximity communication interface of the distributer system 106 may also be any other device equipped to capture or read a barcode image displayed on a mobile device.

The enterprise system 102 may be a network system that communicates through a communications network with the mobile device 104 and/or with the distributer system 106. The enterprise system 102 may also communicate with the mobile device 104 through an electronic certificate service provider. The enterprise system 102 may communicate with the mobile device 104 and/or distributer system 106 through an SMS message, an email, or other network communication protocols.

In one example, the enterprise system 102 sends a notification message 108 to the mobile device 104 through an SMS message when electronic certificates have been created and/or assigned. Then enterprise system 102 may assign an electronic certificate to the mobile device 104 by associating the electronic certificate with the MSISDN of the mobile device 104. The enterprise system 102 may include a database, list, or other set of information containing the MSISDN's of electronic certificate mobile devices. An SMS message is merely one example of the communication protocols the enterprise system may use to communicate with the mobile device 104.

When notified of the new electronic certificates, the mobile device 104 synchronizes 110 a user account associated with the mobile device 104 with a corresponding user account maintained by the enterprise system 102 over a communications network. The synchronization 110 may be initiated automatically upon receipt of the notification message 108 that new electronic certificates have been assigned, or may be initiated manually by the user using the mobile device 104 through the electronic certificate subscriber application installed on the mobile device 104. Once synchronized, the electronic certificate is stored on the mobile device 104 and may be transferred to an electronic certificate distributer system 106 in connection with a data transfer.

When the device participates in a data transfer with a distributer system (e.g., a point-of-sale device using the electronic certificate distributer system 106), the mobile device 104 and distributer system 106 may open a communication channel 112 through their respective proximity communication interfaces when sufficiently proximate to each other. Sufficient proximity may depend on the proximity communication technology used. For example, for NFC sufficient proximity between the communication interfaces of the mobile device 104 and the distributer system 106 may be up to approximately 10 cm. For Bluetooth, sufficient proximity may be up to approximately 30 m. For RFID, sufficient proximity may be up to approximately 3 m. For IrDa, sufficient proximity may be up to approximately 5 m.

If the proximity technology used is NFC, the user can hold the mobile device 104 up to, or otherwise pass the mobile device 104 in front of, the distributer system 106 in order to transfer the electronic certificate to the distributer. NFC provides an efficient and secure communication channel between the mobile device 104 and the distributer system 106.

If the proximity technology used is QR code recognition, the user can hold the mobile device 104 displaying the selected electronic certificate up to a camera, infrared scanner or other barcode capturing device. The distributer system 106 may decode the captured barcode to obtain the data associated with the electronic certificate.

In connection with the transfer of the electronic certificate to the distributer system, the distributer system 106 may transmit distributer data and data transfer data (such as a value of a cost metric for the data transfer) to the mobile device 104. The distributer system 106 may receive the electronic certificate and user data transmitted from the mobile device 104. The distributer system 106 applies the electronic certificate to the data transfer data to generate updated data transfer data.

The distributer system 106 may complete the data transfer based on the updated data transfer data, or may transmit the updated data transfer data to the electronic device or another back-end system for calculating and recording data transfers. The distributer system 106 may also transmit the updated data transfer data to the mobile device 104 through its proximity communication interface. The distributer system 106 and/or the mobile device 104 may transmit an electronic certificate data transfer summary to the enterprise system 102 or any other entity that created or issued the electronic certificate.

Figure 2:
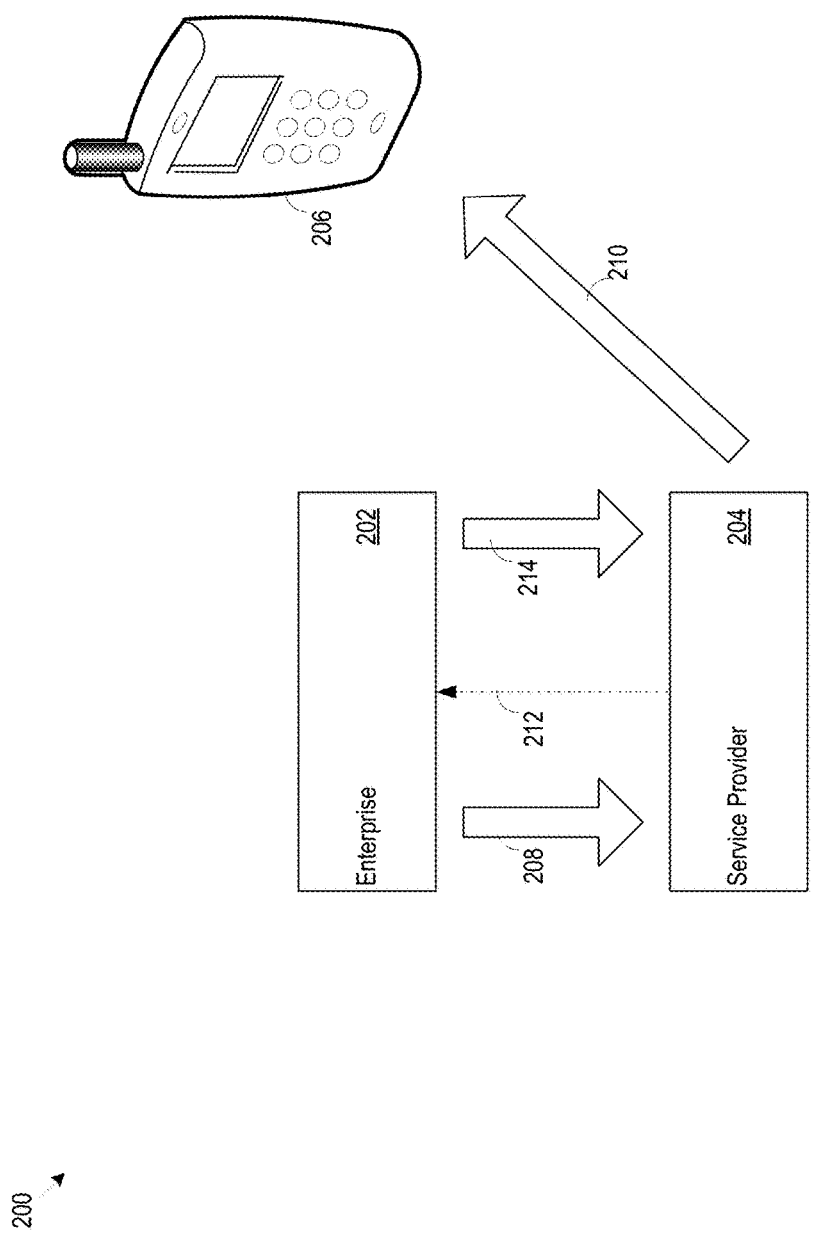
FIG. 2 shows dataflow in another example electronic certificate environment.

FIG. 2 shows dataflow in an exemplary electronic certificate environment 200 including an enterprise system 202, an electronic certificate service provider 204, and an electronic certificate mobile device 206. The enterprise system 202 transmits electronic certificate distribution instructions 208 to the service provider 204. The service provider 204 may be an entity that creates and/or distributes electronic certificates. The service provider 204 in turn distributes 210 the electronic certificates to the electronic certificate mobile device 206 in accordance with the electronic certificate distribution instructions 208. Communication between the enterprise system 202, service provider 204, and the mobile device 206 may be implemented through SMS message, email, or other network communication protocols.

The distribution instructions 208 may include a type and quantity of electronic certificate to distribute, as well as a list of users or mobile devices 206 assigned to receive the electronic certificates. Alternative to the distribution list of specific users or mobile devices, the distribution instructions may also include distribution criteria according to which the service provider 204 distributes the electronic certificates. If the electronic certificate is a promotional advertisement related to athletics, the distribution instructions may identify the electronic certificate for distribution to mobile devices 206 associated with users that have an interest in athletics. User interests may be deduced based on the user's purchasing and/or browsing history, based on survey data, or based on information provided directly by the user. The electronic certificate subscriber application installed on the mobile device 206 may also be configured to allow the user to specifically request certain types of advertising content, or other types of certificates. In this manner, electronic certificates, such as advertising content, may be directed to users most likely to be interested in such promotional material on their mobile devices 206.

The service provider 204 may transmit an electronic certificate distribution summary 212 that summarizes the number and type of electronic certificates sent to users within a certain time period. The electronic certificate distribution summary 212 may also include an amount due for the service. The enterprise system may transmit a service payment 214 to the service provider based on the electronic certificate distribution summary.

Figure 3:
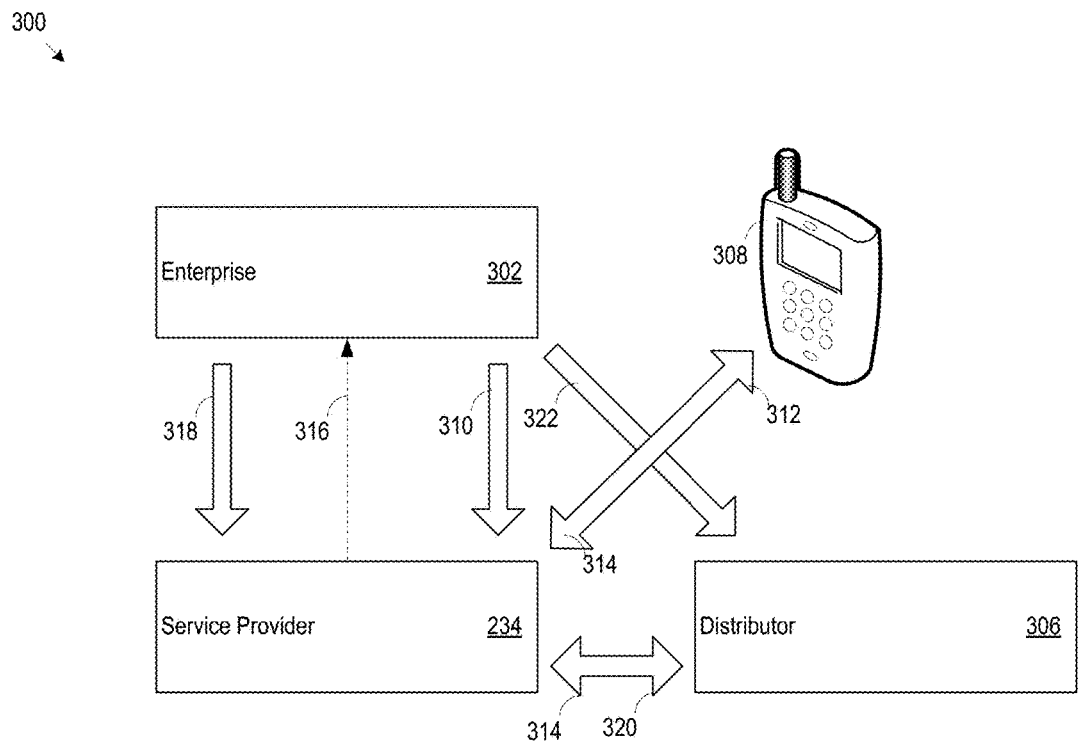
FIG. 3 shows dataflow in another exemplary electronic certificate environment.

FIG. 3 shows dataflow in another exemplary electronic certificate environment 300 including an enterprise system 302, an electronic certificate service provider 304, an electronic certificate distributer system 306, and an electronic certificate mobile device 308. The enterprise system 302 creates and transmits electronic certificate distribution instructions 310 to the service provider 304. The service provider 304 in turn distributes 312 the electronic certificates to the electronic certificate mobile device 308 according to the electronic certificate distribution instructions.

The mobile device 308 may then transfer the electronic certificate to the electronic certificate distributer system 306 in connection with a data transfer. For example, a user purchasing a good or service from a distributer using the distributer system 306 may transfer a digital 10% off certificate to the distributer using an electronic certificate subscriber application installed on the mobile device 308. The distributer system 306 applies the obtained electronic certificate to the data transfer to generate an updated data transfer cost metric value. The distributer system 306 may transmit the updated data transfer cost metric value to the mobile device 308. The mobile device 308 and distributer system 306 may communicate using NFC, Bluetooth, RFID, IrDa, or other proximity communication protocols. The distributer system 306 may also receive the electronic certificate and other data from the mobile device 308 by capturing and decoding a barcode image (such as a QR code image) displayed on the mobile device 308.

When the user transfers and the distributer processes the electronic certificate in connection with the data transfer, the electronic certificate subscriber application installed on the mobile device 308, or an electronic certificate distributer application installed on the distributer system 306, may transmit an electronic certificate transfer report 314 to the service provider 304. The transfer report 314 may include details of the data transfer, including information identifying the distributer, the data transfer, the electronic certificate used, data transfer date, and other relevant information.

The service provider 304 may transmit an electronic certificate distribution summary 316 that summarizes the number and type of electronic certificates sent to users within a certain time period. The electronic certificate distribution summary 316 may also include a summary of electronic certificate transfer reports 314 indicating electronic certificates actually used and transferred to distributers. The electronic certificate distribution summary 316 may also include an amount due for the service. The service provider 304 may also generate and transmit to the distributer system 306 a distributer-specific certificate summary 320 summarizing the number and type of electronic certificates transferred to the distributer within a certain time period.

Based on the electronic certificate distribution summary 316, the enterprise system may transmit a service payment 318 to the service provider 304 based on its distribution services. The enterprise system 302 may also refund 322 the distributer the value of the discounts provided in response to the electronic certificate.

Figure 4:
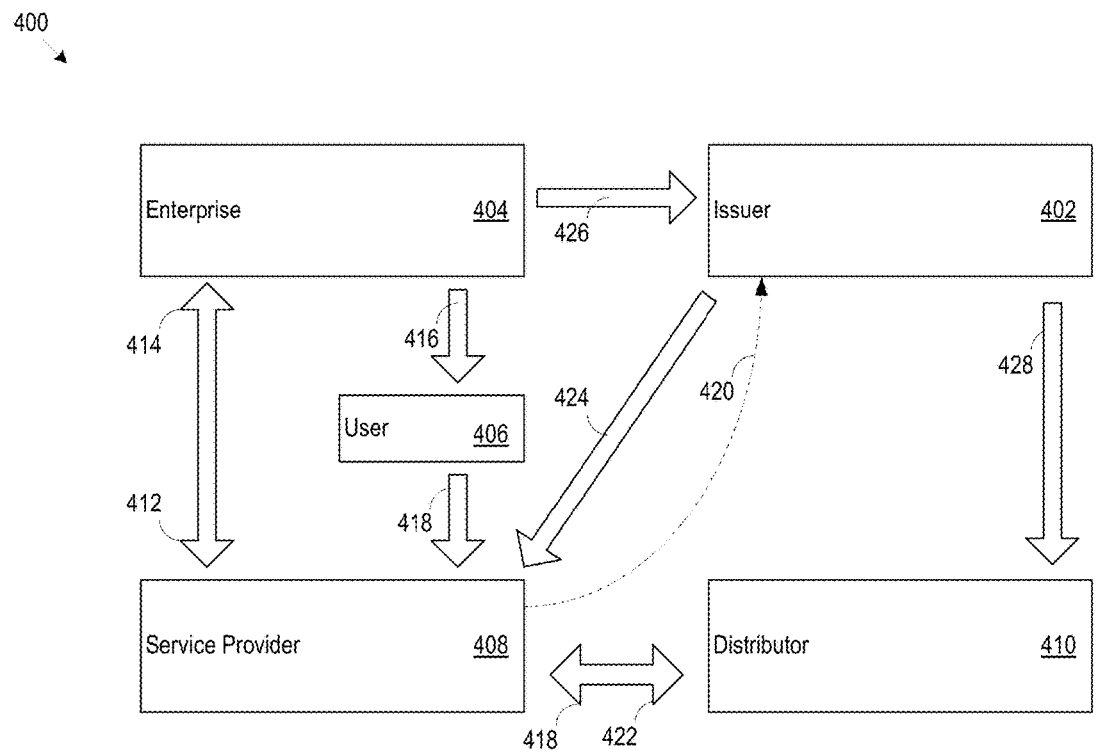
FIG. 4 shows dataflow in another electronic certificate environment including an issuer.

FIG. 4 shows dataflow in another exemplary electronic certificate environment 400 including an issuer 402. The environment 400 also includes an enterprise system 404, an electronic certificate mobile device 406, an electronic certificate service provider 408, and an electronic certificate distributer system 410.

The issuer 402 may be an entity that issues electronic certificates in the form of, for example, restaurant tickets (e.g., luncheon certificate, meal tickets), transportation tickets, theatre tickets, or other ticket types for distribution to the mobile devices 406 of users. The enterprise system 404 may receive from the issuer 402, or may create based on information received from the issuer 402, ticket distribution instructions 412.

The enterprise system 404 may transmit the ticket distribution instructions 412 to the service provider 408. The service provider 408 issues 414 the digital tickets to the enterprise system 404 based on the ticket distribution instructions 412. The enterprise system 404 distributes 416 the digital tickets to the user's mobile device 406.

When the user transfers and the distributer processes the electronic certificate in connection with the data transfer, the electronic certificate subscriber application on the mobile device 406, or an electronic certificate distributer application installed on the distributer system 410, may transmit an electronic certificate transfer report 418 to the service provider 408. The transfer report 418 may include details of the data transfer, including information identifying the distributer, the data transfer, the digital ticket used, data transfer date, and other relevant information.

The service provider 408 may transmit to the issuer 402 and/or enterprise system 404 an electronic certificate distribution summary 420 that summarizes the number and type of electronic certificates sent to users within a certain time period. The electronic certificate distribution summary 420 may also include a summary of electronic certificate transfer reports 418 indicating digital tickets actually used and transferred to distributers. The electronic certificate distribution summary 420 may also include an amount due for the service. The service provider 408 may also generate and transmit to the distributer system 410 a distributer-specific certificate summary 422 summarizing the number and type of digital tickets transferred to the distributer within a certain time period.

Based on the electronic certificate distribution summary 420, the issuer 402 may transmit a service payment 424 to the service provider 304 based on its distribution services. The enterprise system 404 may pay 426 the issuer 402 for the value of the tickets issued. The issuer 402 may also refund 428 the distributer the value of the discounts provided in response to the electronic certificate.

Figure 5:
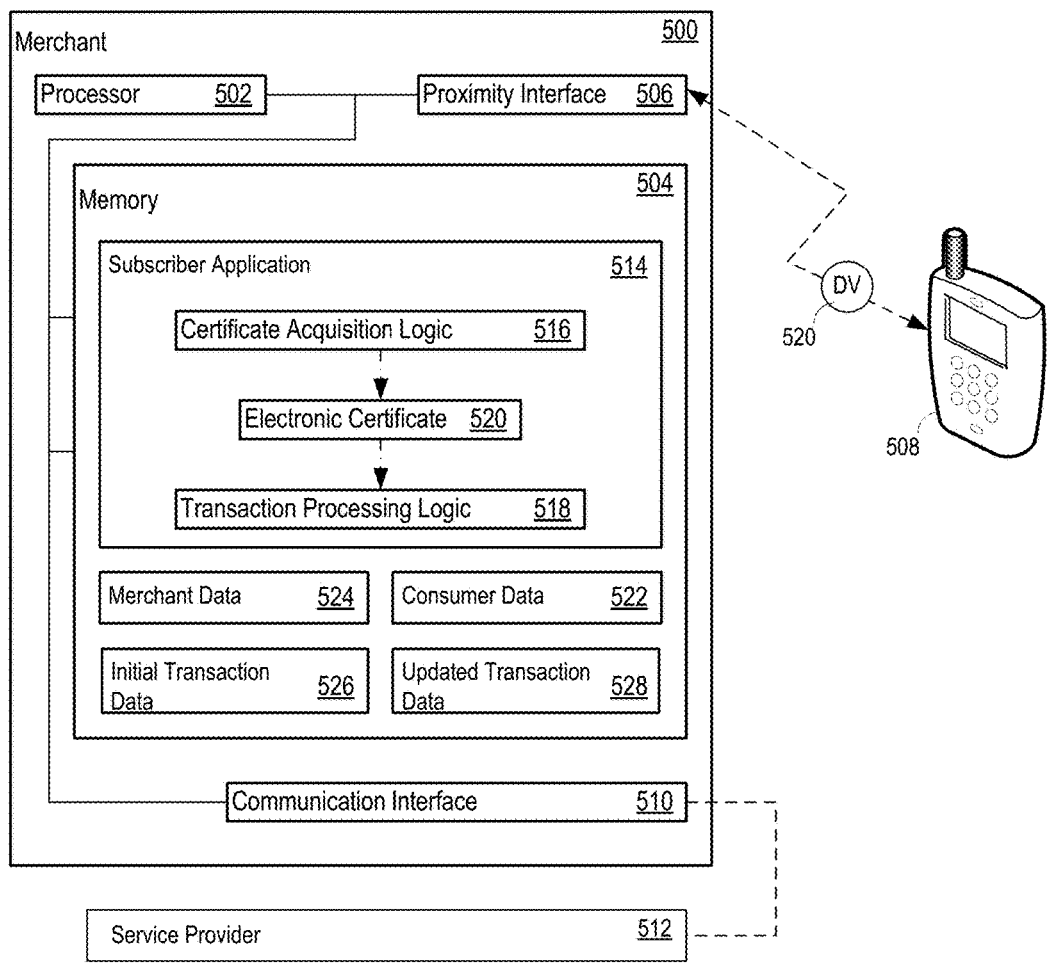
FIG. 5 shows a distributer system for use in an electronic certificate environment.

FIG. 5 shows a distributer system 500 for use in an electronic certificate environment. The distributer system 500 includes a processor 502 and a memory 504. The distributer system 500 includes a proximity communication interface 506 for communicating with a nearby electronic certificate device 508, such as a cellular phone. The distributer system 500 may also include a communication interface 510, such as a network communication interface, for communicating with an electronic certificate service provider 512.

The memory 504 holds an electronic certificate distributer application 514 that assists in obtaining and processing electronic certificates received from a proximate electronic certificate device 508 in connection with a data transfer. The distributer application 514 includes electronic certificate acquisition logic 516 and data transfer processing logic 518.

The certificate acquisition logic 516 may assist the distributer system 500 in determining that an electronic certificate device 508 is proximate to the proximity communication interface 506 and obtaining the electronic certificate from the electronic certificate device 508 through the interface 506. The memory may hold the obtained electronic certificate 520. The electronic certificate 520 may include certificate data, such as the certificate type (e.g., whether the certificate is a percentage discount certificate, a restaurant ticket, a promotional advertisement, etc.), a certificate amount, an expiration data, a certificate ID number, a certificate name, a certificate quantity, a certificate service provider (e.g., which service provider distributed or issued the certificate) or other information relevant to processing the electronic certificate 520. If the electronic certificate 520 is obtained by capturing a barcode image displayed on the mobile device, the certificate acquisition logic may include logic that decodes the barcode image.

The certificate acquisition logic 516 may also obtain, and the memory hold, customer data 522 from the electronic certificate device 508. The customer data 522 may include information identifying the customer and/or the customer's mobile device 508, such as the MSISDN or the customer's name.

The memory 504 may also hold distributer data 524 and initial data transfer data 526. The distributer data 524 may include information identifying the distributer, such as the distributer's name. The initial data transfer data 526 may include information identifying the particular data transfer entered into between the distributer and a customer using the electronic certificate device 508. The information identifying the data transfer may include, for example, the type of good or service subject to the data transfer and the cost metric value. The certificate acquisition logic 516 may transmit the distributer data 524 and data transfer data 526 to the electronic certificate device 508 through the proximity communication interface 506.

The data transfer processing logic 518 may assist the distributer system 500 in applying the electronic certificate 520 to a data transfer, and in particular, to the initial data transfer data 526 to generate updated data transfer data 528. The updated data transfer data 528 may be, for example, and new data transfer cost metric value updated based on the electronic certificate 520. If the electronic certificate 520 is a percentage for fixed discount certificate, the data transfer processing logic 518 may reduce the data transfer cost metric value by the percentage or fixed discount amount. If the electronic certificate 520 is a fidelity card, the data transfer processing logic 518 may update the fidelity card based on the data transfer (such as by adding to rewards points associated with the fidelity account). The data transfer processing logic 518 transmit the updated data transfer data 528 to the electronic certificate device 508 through the proximity communication interface 506. The electronic certificate distributer application 514 may automatically acquire and process the electronic certificate 520, or may include a user interface 530 through which a manager or other distributer personnel initiate electronic certificate acquisition and/or processing.

The distributer system 500 may communicate with the service provider 512 through the communication interface 510. The electronic certificate distributer application 514 may transmit an electronic certificate data transfer report summarizing the data transfer and identifying the electronic certificate used by the electronic certificate device 508.

Figure 6:
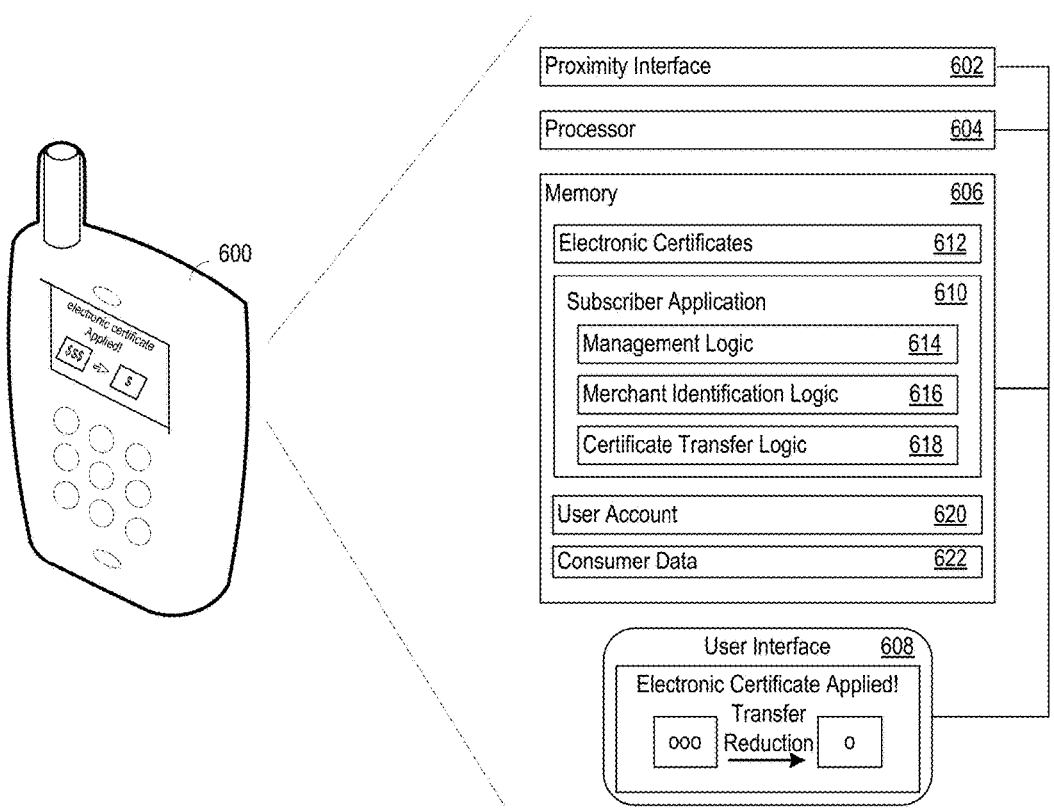
FIG. 6 shows an electronic certificate device, such as a cellular phone.

FIG. 6 shows an electronic certificate device 600, such as a cellular phone. The electronic certificate device 600 includes a proximity communication interface 602, a processor 604, and a memory 606. The electronic certificate device 600 also includes a display 608.

The memory 606 may hold an electronic certificate subscriber application 610 that aids a user using the device 600 in managing electronic certificates 612 stored on the memory and transferring them to distributers as part of a data transfer. The electronic certificates 612 may be organized in a certificate database 614 stored on the memory 606. The subscriber application 610 may include electronic certificate management logic 616, proximate distributer identification logic 618, and electronic certificate transfer logic 620.

The electronic certificate management logic 616 aids the device 600 in receiving and managing new electronic certificates. The device 600 may receive an SMS message, email, or other type of communication from service provider or enterprise system indicating that new electronic certificates have been assigned to the device 600.

The electronic certificate management logic 616 may synchronize a user account 622 stored on the memory 606 with a corresponding user account maintained by the service provider or enterprise system. The electronic certificate management logic 616 may initiate synchronization immediately upon being notified of the new electronic certificates, or may prompt the device's 600 user to initiate synchronization through the display 608. Synchronization may include transferring to the mobile device 600 any new electronic certificates assigned to the device 600 by the service provider or enterprise system.

The electronic certificate 612 may be transferred as a string of bytes representing certificate data, or parameters. An image associated with the electronic certificate 612 may also accompany the transfer. The electronic certificate 612 may be downloaded by the mobile device using an HTTP structure or sent to the mobile device as a binary SMS using the UDH port. For example, if the electronic certificate 612 includes an image, the metadata associated with the electronic certificate 612 may be downloaded using an HTTP structure. If the electronic certificate 612 is string of data with no image, the electronic certificate 612 may be downloaded using an HTTP structure or sent to the mobile device 600 by SMS, the SMS body including a string of values corresponding to the electronic certificate 612. Table 1 below shows an example of electronic certificate parameters for an electronic certificate 612 that includes an image. Table 2 below shows an example of electronic certificate parameters for an electronic certificate 612 that does not include an image.

TABLE 1

Certificate quantity
Certificate name
Certificate type
Certificate amount
Certificate service provider
Reference of body image included into the body (starting and ending byte). The response body may include a string of bytes for the image.

TABLE 2

Certificate quantity
Certificate identification number
Certificate amount
Certificate service provider Synchronization may also include removing used or expired electronic certificates from the device 600. The electronic certificate management logic 616 may include logic operable to flag any used or expired electronic certificate for deletion.

The proximate distributer identification logic 618 aids the device 600 in detecting whether an electronic certificate distributer system is proximate to the proximity communication interface 602. The proximity communication interface 602 may be configured for NFC, Bluetooth, RFID, IrDa, or other proximity communication protocols.

When sufficiently proximate to a corresponding proximity communication interface of a distributer system, the device 600 may receive distributer data and data transfer data associated with a data transfer. The distributer data may include information identifying the distributer. The data transfer data may include information identifying the type and quantity of good or service that is subject to the data transfer, as well as the data transfer cost metric value.

The electronic certificate transfer logic 620 aids the device 600 in transmitting an electronic certificate 612 to the distributer in connection with the data transfer. The electronic certificate transfer logic 620 may automatically select an electronic certificate to be transferred to the distributer, or may provide a user interface through the display 608 through which the user selects the electronic certificate to be used. The electronic certificate transfer logic 620 may display to the user all electronic certificates 612 held on the memory, or may tailor which certificates to display to the user based on, for example, the identity of the distributer. For example, some electronic certificates 612 may only apply to specific distributers. Other electronic certificates 612 may only apply to a specific type of good or service. An electronic certificate 612 held on the memory 606 may be a certificate redeemable for a free soft drink with the data transfer of a sandwich from a particular food distributer. If the data transfer data received from the distributer system indicates that a sandwich is not subject to the data transfer and thus that the electronic certificate cannot be used, the electronic certificate transfer logic 620 may hide that particular electronic certificate from display in order to present the user with the most relevant electronic certificate options.

When an electronic certificate 612 is selected, the electronic certificate transfer logic 618 transmits the electronic certificate 612 to the distributer system through the proximity communication interface 602. The electronic certificate 612 may include certificate data such as expiration date, value of the electronic certificate, applicable distributers or good or services, or other information that may assist the distributer system in processing the electronic certificate 612. When an electronic certificate 612 is selected, the electronic certificate transfer logic 620 may also display a barcode image representing the certificate data, as well as any other pertinent data (e.g., user data) to be captured by the proximity communication interface of the distributer system.

The electronic certificate transfer logic 620 may also transmit user data 624 held on the memory to the distributer system through the proximity communication interface 602. The user data may include information identifying the user or the user's device 600, such as a proper name, a user name, the MSISDN of the device 600, or other identifying information.

Figure 7:
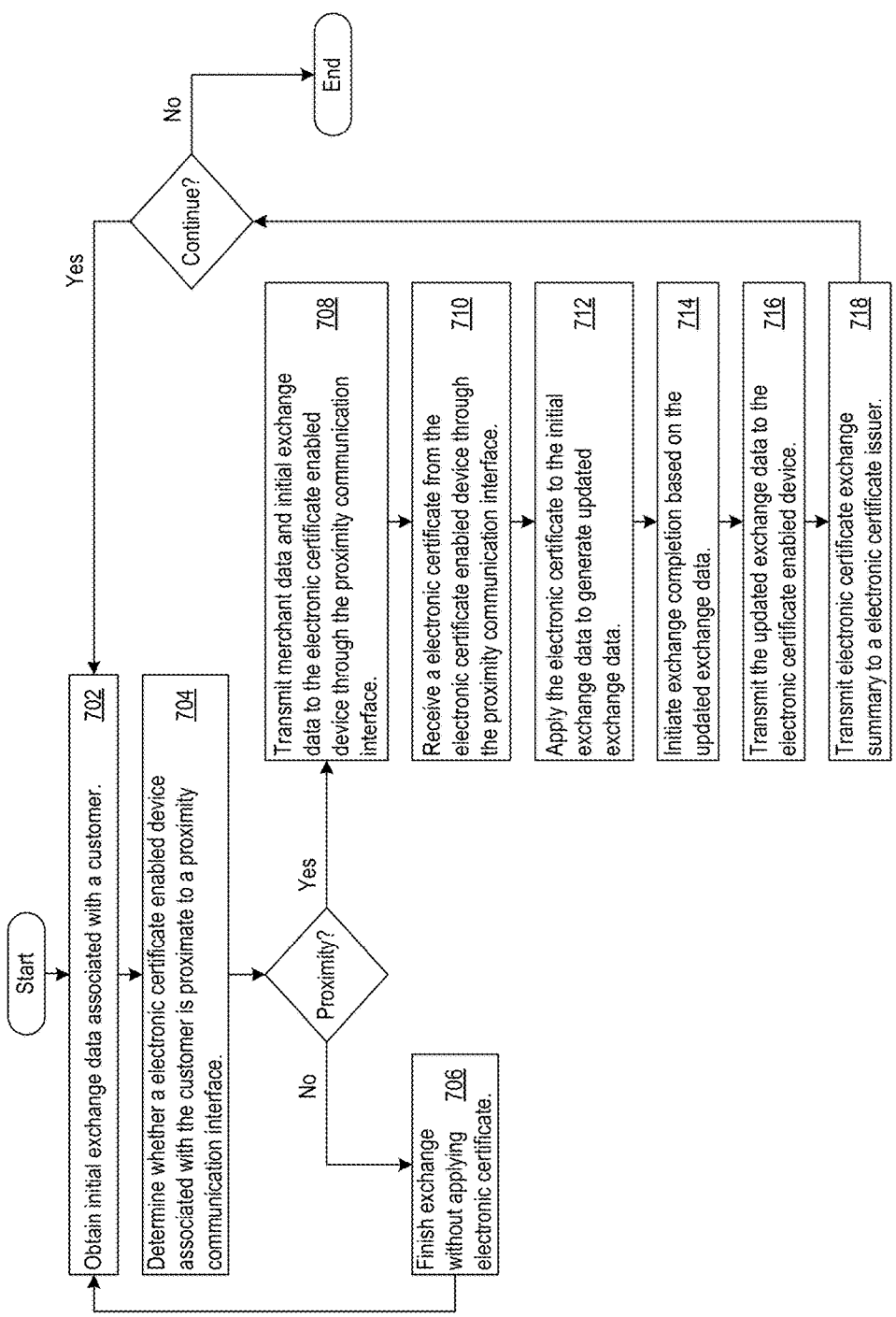
FIG. 7 shows logic that an electronic certificate distributer application installed on an electronic certificate distributer system may execute to handle electronic certificates.

FIG. 7 shows logic that an electronic certificate distributer application installed on an electronic certificate distributer system may execute to handle electronic certificates. Electronic certificate acquisition logic of the distributer application obtains initial data transfer data associated with a customer (702). The initial data transfer data may be a data transfer cost metric value of the goods or services that is subject to the data transfer by the user. The initial data transfer data may also include information identifying the type and quantity of goods or services that is subject to the data transfer. The certificate acquisition logic may store the initial data transfer data on a memory of the distributer system.

The certificate acquisition logic may prompt distributer personnel to enter the initial data transfer data, such as the data transfer cost metric value, in order to obtain the initial data transfer data. The distributer system may also be connected, directly or through a network, to a cash register or other electronic device for calculating and recording data transfers. Through that connection, the certificate acquisition logic may obtain the initial data transfer data from the electronic data transfer device.

The certificate acquisition logic determines whether an electronic certificate mobile device, such as a cellular device, associated with the transacting user is proximate to a proximity communication interface of the distributer system (704). If the proximity communication interface is an NFC device, the NFC device of the distributer system will detect an NFC device on an electronic certificate mobile device when the respective NFC devices are within approximately 10 cm from each other. The certificate acquisition logic may query the proximity communication interface to determine if an electronic certificate mobile device is proximate to the distributer system.

If no electronic certificate mobile device associated with the transacting customer is proximate to the proximity communication interface of the distributer system, the data transfer is completed without applying any electronic certificate to the data transfer (706). If the certificate acquisition logic determines that an electronic certificate mobile device is proximate to the proximity communication interface of the distributer system, the certificate acquisition logic may transmit distributer data and the initial data transfer data to the electronic certificate mobile device through the proximity communication interface (708).

The certificate acquisition logic receives an electronic certificate from the electronic certificate enable mobile device through the proximity communication interface (710). The electronic certificate may include certificate data identifying the type, quantity, and/or amount of the electronic certificate, an expiration data, a certificate ID number, a certificate service provider, or other relevant information. If the electronic certificate was acquired by capturing a barcode image displayed on the mobile device, the certificate acquisition logic may decode the captured barcode image to obtain the electronic certificate data.

Certificate processing logic of the distributer application applies the electronic certificate to the initial data transfer data to generate updated data transfer data (712). The certificate processing logic may determine a value of the electronic certificate based on the certificate data and reduce or otherwise modify the initial data transfer data by the determined value.

If the electronic certificate is a fidelity card that earns the customer points on data transfers made from the distributer, the certificate processing logic may updated the users' points total based on the data transfer cost metric value. In the fidelity card example, the updated data transfer data may include a report indicating the users' total fidelity points after the data transfer. In other examples, the updated data transfer data may include an updated data transfer cost metric value.

The certificate processing logic may initiate data transfer completion based on the updated data transfer data (714). The certificate processing logic may transmit the updated data transfer data to the distributer's electronic data transfer device (such as the cash register) in order to charge the customer the updated data transfer amount. The certificate processing logic may display the updated data transfer data to distributer personnel to allow the distributer personnel to modify the data transfer amount shown on the electronic data transfer device and charge the correct the updated amount to the user. The certificate processing logic may transmit the updated data transfer data to the electronic certificate mobile device through the proximity communication interface (716).

The certificate processing logic may transmit an electronic certificate data transfer summary to an electronic certificate service provider (718). The electronic certificate data transfer summary may include a summary of the data transfer in which the electronic certificate was used. The summary may include information identifying the electronic certificate used, the type and/or quantity of good or service that is subject to the data transfer, the user, the user's mobile device, the distributer, the data transfer date, or other information relevant to the data transfer.

Figure 8:
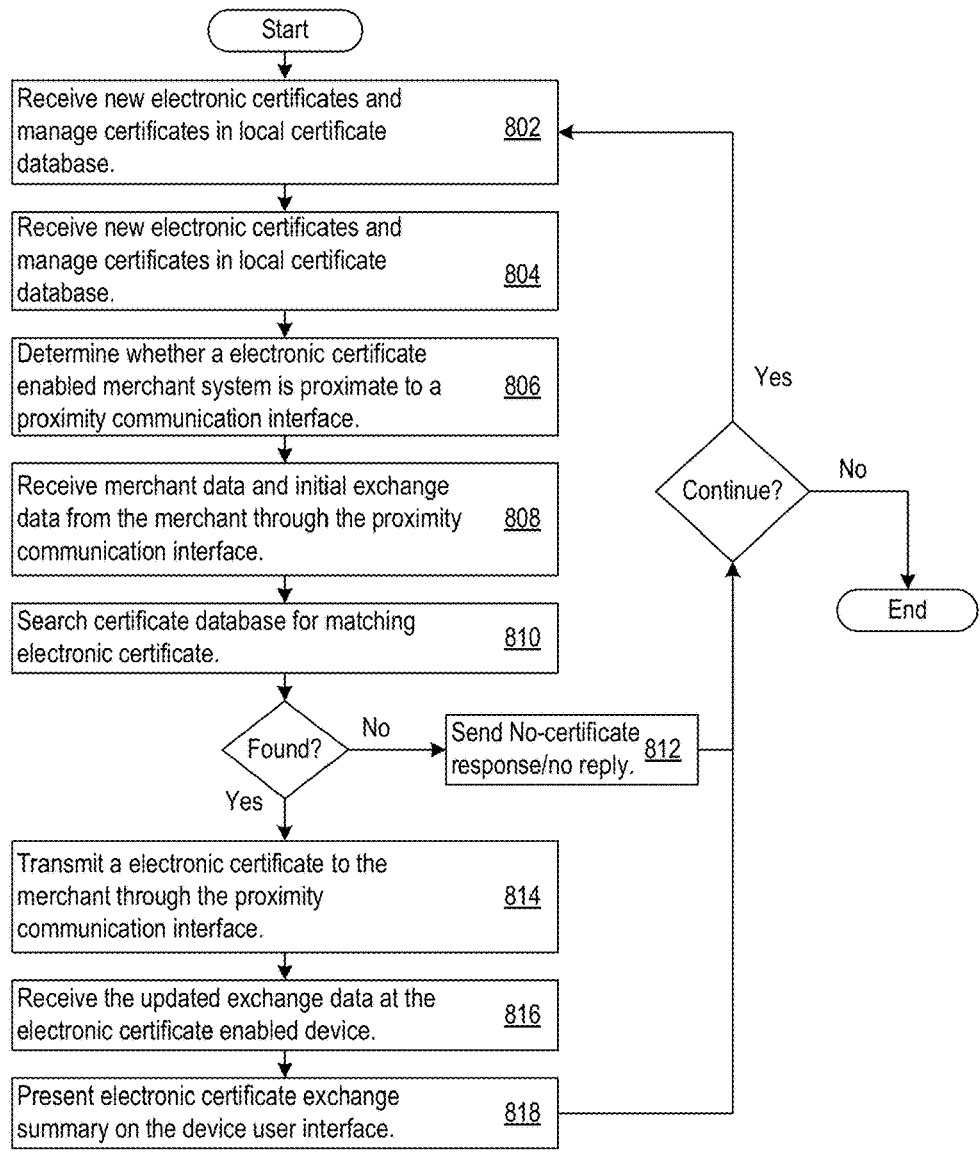
FIG. 8 shows logic that an electronic certificate subscriber application installed on an electronic certificate device may execute to handle electronic certificates.

FIG. 8 shows logic that an electronic certificate subscriber application installed on an electronic certificate device may execute to handle electronic certificates. Electronic certificate management logic of the subscriber application receives notification of new electronic certificates and manages the electronic certificates in a local certificate database (802). The certificate management logic may receive an SMS message, email, or other communication indicating that new electronic certificates have been assigned to the mobile device.

The certificate management logic synchronizes a user account stored on the mobile device with a remote user account maintained by the entity directing certificate distribution, such as an enterprise system or an electronic certificate service provider (804). The new electronic certificates may be organized and managed with any existing electronic certificates stored on the mobile device. With the electronic certificates transferred to and stored on the mobile device, the user is able to transfer the electronic certificates to nearby distributers in paperless, real time, and secure electronic certificate transfers.

The subscriber application detects whether an electronic certificate distributer system is proximate to a proximity communication interface of the mobile device (806). If the proximity communication interface is an NFC device, the NFC device of the mobile device will detect an NFC device on an electronic certificate distributer system when the respective NFC devices are within approximately 10 cm from each other. The subscriber application may query the proximity communication interface to determine if an electronic certificate distributer system is proximate to the mobile device.

If an electronic certificate distributer system is proximate to the mobile device, the subscriber application receives distributer data and the initial data transfer data through the proximity communication interface (808). Based on the distributer data and initial data transfer data, the subscriber application may search the certificate database for a matching electronic certificate (810). The user may prompt the user through a display to select an electronic certificate. The subscriber application may be operable to automatically match the distributer and initial data transfer data with an electronic certificate. If no matching electronic certificate is found by the subscriber application or selected by the user, the application transmits a no-certificate response to the distributer through the proximity communication interface, or merely sends no data at all to the distributer (812).

If a matching electronic certificate is found by the subscriber application or selected by the user, the subscriber application transmits the electronic certificate to the distributer through the proximity communication interface (814). The subscriber application may also transmit user data to the distributer through the proximity communication interface.

On the distributer side, the distributer applies the electronic certificate to the initial data transfer data to generate updated data transfer data. The subscriber application may receive the updated data transfer data through the proximity communication interface (816). The subscriber application may present an electronic certificate data transfer summary on a user interface of the mobile device (818). The electronic certificate data transfer summary may include the initial and updated data transfer data, an amount saved, the electronic certificate used, the type and quantity of goods or services that is subject to the data transfer, or other information relevant to the data transfer. The subscriber application may also transmit the electronic certificate data transfer summary to an electronic certificate service provider, enterprise system, or other entity that directs the issuance and distribution of electronic certificates.

Figure 9:
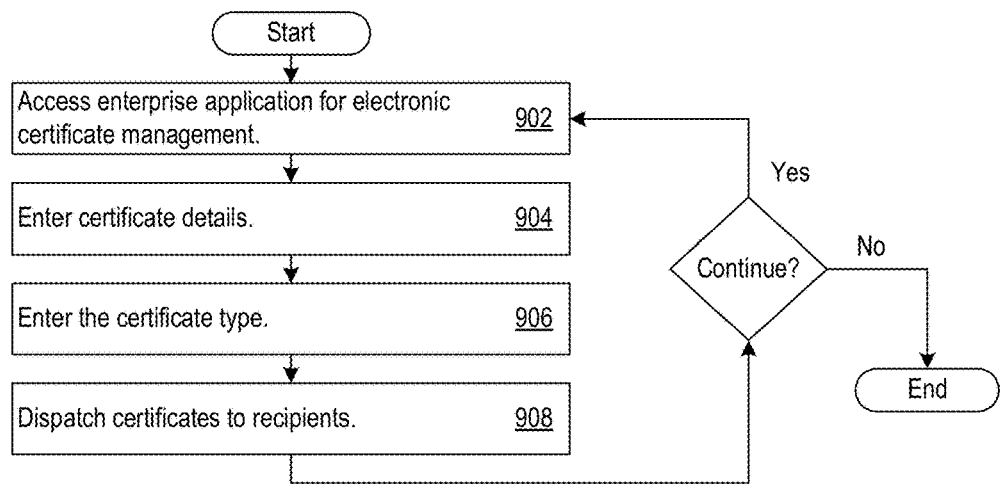
FIG. 9 shows a flow diagram of electronic certificate creation.

FIG. 9 shows a flow diagram of electronic certificate creation by an enterprise application. An enterprise manager accesses the enterprise application for electronic certificate creation and management (902). The manager may interact with the enterprise application through a user interface provided by the application. The enterprise application may run on a desktop, handheld, or other computing device.

The manager enters certificate details (904), including expiration date, distribution group, distribution quantity, or other certificate information. The distribution quantity may indicate how many of each certificate should be distributed to the members of the distribution group. The distribution group identifies the users to which the certificates will be assigned an ultimately distributed. The distribution group may identify a set or subset of employees of a company to receive electronic certificates. If the electronic certificates are to be assigned to employees of a company, the certificate details may also include a company name. The certificate details may also include the MSISDN, or a list of MSISDN's, of the mobile device(s) to receive the assigned electronic certificates.

The manager selects the electronic certificates to be sent (906). The enterprise application may provide the manager with a list of electronic certificates organized by certificate type (such as "promotional", "ticket", and "certificate"). The enterprise application may also indicate for each listed electronic certificate the certificate's value, as well as whether the certificate applies to any specific goods, services, and/or distributers.

After the certificates to be distributed are identified, the enterprise application dispatches the electronic certificates to the designated recipients at the manager's instructions (908). The enterprise application may provide, for example, a "send certificates" bottom that the manager clicks or presses to dispatch the certificates. Dispatching the electronic certificates may include transmitting instructions (such as certificate type, distribution group) to a certificate service provider for the distribution of the electronic certificates to the designated recipients. The enterprise application may also transmit a notification through an SMS message, email, or other communication to the designated recipients that the new electronic certificates have been assigned.

In some implementations, the electronic certificates may be used in data transfers, such as merchant sales transactions, as digital vouchers. For example, a distributor, such as a merchant, may operate digital voucher merchant system which may interact with a mobile device of a user when brought within a pre-determined range of the digital voucher merchant system. Further, enterprise systems may distribute the digital vouchers to mobile devices. For example, U.S. patent application Ser. No. 12/422,675, filed on Apr. 13, 2009, entitled Digital Voucher Processing System, and European Patent Application No. 09 425 963.6, filed Feb. 16, 2009 each of which is incorporated by reference herein in its entirety, detail techniques and architectures that may be used in digital voucher implementations of the electronic certificate system. As described therein, the example product, method, and digital voucher processing system detailed below may be used in digital voucher data transfers.

In some cases, a product includes: a machine-readable medium other than a transitory signal; and instructions stored on the machine-readable medium. The instructions are configured to, when executed by a processor of a mobile device: obtain a new voucher message via a wireless networking interface of the mobile device, the new voucher message indicating that digital vouchers are available from a digital voucher provider, the new voucher message sent responsive to a dispatch command issued by a manager of the digital voucher provider; after receiving the new voucher message, transmit user data, via an RF communication link established using the wireless networking interface, to update a user account associated with an identifier unique to the mobile device; obtain, via the RF communication link, a new digital voucher from the enterprise management system, the new digital voucher assigned to the mobile device according to a distribution criterion met by the user account, store the new digital voucher in memory among a plurality of digital vouchers by selecting among data structures in the memory, and delete a previously stored voucher that has expired from among the plurality of vouchers. The user data includes: user purchase history data; and user browsing history data. The new digital voucher encoded as a data structure includes: a voucher name field; a voucher type field; a voucher amount field; and a voucher provider field including an indicator of the digital voucher provider. The data structures in the memory include: data structures for digital vouchers that include an image field; and data structures for digital vouchers that do not include an image field.

The instructions, when executed, are further configured to cause the processor to: determine, using a proximity communication interface, whether a digital voucher enabled merchant system is within a predetermined distance from the proximity communication interface; in response to a determination that the digital voucher enabled merchant system is within a predetermined distance from the proximity communication interface, receive, via the proximity communication interface, initial transaction data from the digital voucher enabled merchant system associated with a transaction and merchant data associated with the digital voucher enabled merchant system; compare, without requesting user input, the plurality of digital vouchers to the initial transaction data and the merchant data by comparing the initial transaction data and the merchant data to the data structure of the new digital voucher; responsive to comparing the digital vouchers to the initial transaction data and the merchant data, determine that the new digital voucher is irrelevant to the transaction; responsive determining the new digital voucher is irrelevant, omit the new digital voucher of the plurality of digital vouchers from a digital voucher listing of digital vouchers relevant to the transaction; before completing the transaction, instruct a display of the mobile device to present the digital voucher listing with the new digital voucher omitted; receive, from user input, a selection of an available digital voucher within the digital voucher listing responsive to the presentation of the digital voucher listing; transmit, using the proximity communication interface, the available digital voucher to the digital voucher enabled merchant system, receive updated transaction data from the digital voucher enabled merchant system; and instruct the display to present a digital voucher transaction summary.

In an implementation of the product, the initial transaction data includes an initial transaction amount and the updated transaction data includes an updated transaction amount modified based on the available digital voucher.

In another implementation of the product, the available digital voucher includes a restaurant voucher.

In yet another implementation of the product, the proximity communication interface includes a near field communication (NFC) interface; and the wireless networking interface includes a wireless local area network (WLAN) interface, a cellular data interface, or both. The instructions, when executed, are further configured to transmit the available digital voucher to the digital voucher enabled merchant system through the NFC interface.

In another implementation of the product, the instructions, when executed, are further configured to generate a digital voucher transaction report including information identifying the available digital voucher and identifying the transaction; and transmit the digital voucher transaction report to a digital voucher issuer. In some scenarios, the digital transaction report transmitted to the digital voucher issuer further includes an identification of the available digital voucher enabled mobile device, data indicating a type of good or service subject to the transaction, or data indicating a quantity of good or service subject to the transaction, or any combination thereof.

In yet another implementation of the product, the available digital voucher includes a fidelity card that earns a customer points on purchases made from a merchant, and the instructions, when executed, are further configured to update a points total associated with the customer in response to the transaction.

In some cases, a method includes: obtaining a new voucher message via a wireless networking interface of the mobile device, the new voucher message indicating that digital vouchers are available from a digital voucher provider, the new voucher message sent responsive to a dispatch command issued by a manager of the digital voucher provider; after receiving the new voucher message, transmitting user data, via an RF communication link established using the wireless networking interface, to update a user account associated with an identifier unique to the mobile device; obtaining, via the RF communication link, a new digital voucher from the enterprise management system, the new digital voucher assigned to the mobile device according to a distribution criterion met by the user account, storing the new digital voucher in memory among a plurality of digital vouchers by selecting among data structures in the memory, and deleting a previously stored voucher that has expired from among the plurality of vouchers. The user data includes: user purchase history data; and user browsing history data. The new digital voucher encoded as a data structure includes: a voucher name field; a voucher type field; a voucher amount field; and a voucher provider field including an indicator of the digital voucher provider. The data structures in the memory include: data structures for digital vouchers that include an image field; and data structures for digital vouchers that do not include an image field.

Additionally or alternatively the method may include determining, using a proximity communication interface, whether a digital voucher enabled merchant system is within a predetermined distance from the proximity communication interface; in response to a determination that the digital voucher enabled merchant system is within a predetermined distance from the proximity communication interface, receiving, via the proximity communication interface, initial transaction data from the digital voucher enabled merchant system associated with a transaction and merchant data associated with the digital voucher enabled merchant system; comparing, without requesting user input, the plurality of digital vouchers to the initial transaction data and the merchant data by comparing the initial transaction data and the merchant data to the data structure of the new digital voucher; responsive to comparing the digital vouchers to the initial transaction data and the merchant data, determining that the new digital voucher is irrelevant to the transaction; responsive determining the new digital voucher is irrelevant, omitting the new digital voucher of the plurality of digital vouchers from a digital voucher listing of digital vouchers relevant to the transaction; before completing the transaction, instructing a display of the mobile device to present the digital voucher listing with the new digital voucher omitted; receiving, from user input, a selection of an available digital voucher within the digital voucher listing responsive to the presentation of the digital voucher listing; transmitting, using the proximity communication interface, the available digital voucher to the digital voucher enabled merchant system; receiving updated transaction data from the digital voucher enabled merchant system; and instructing the display to present a digital voucher transaction summary In an implementation of the method, the initial transaction data includes an initial transaction amount and the updated transaction data includes an updated transaction amount modified based on the second digital voucher.

In another implementation of the method, the proximity communication interface includes a near field communication (NFC) interface, and the method further includes causing the computer processor to transmit the second digital voucher to the digital voucher enabled merchant system through the NFC interface.

In yet another implementation of the method, the method further includes: generating a digital voucher transaction report including information identifying the second digital voucher and identifying the first transaction; and transmitting the digital voucher transaction report to a digital voucher issuer. In some scenarios, the digital transaction report transmitted to the digital voucher issuer further includes an identification of the digital voucher enabled mobile device, data indicating a type of good or service subject to the first transaction, or data indicating a quantity of good or service subject to the first transaction, or any combination thereof.

In yet another implementation of the method, the second digital voucher includes a restaurant voucher.

In some cases, a digital voucher processing system includes: a display; a proximity communication interface; a computer processor coupled to the display and to the proximity communication interface; and a memory coupled to the processor. Additionally or alternatively, the digital voucher processing system may include a wireless networking interface. The memory is coupled to the computer processor, and the memory includes a plurality of digital vouchers. The memory further includes instructions that, when executed, cause the computer processor to: determine, using the proximity communication interface, whether a digital voucher enabled merchant system is within a predetermined distance from the proximity communication interface; in response to a determination that the digital voucher enabled merchant system is within a predetermined distance from the proximity communication interface, receive, via the proximity communication interface, initial transaction data from the digital voucher enabled merchant system associated with a transaction and merchant data associated with the digital voucher enabled merchant system; compare, without requesting user input, the plurality of digital vouchers to the initial transaction data and the merchant data by comparing the initial transaction data and the merchant data to the data structure of the new digital voucher; responsive to comparing the digital vouchers to the initial transaction data and the merchant data, determine that the new digital voucher is irrelevant to the transaction; responsive determining the new digital voucher is irrelevant, omit the new digital voucher of the plurality of digital vouchers from a digital voucher listing of digital vouchers relevant to the transaction; before completing the transaction, instruct a display of the mobile device to present the digital voucher listing with the new digital voucher omitted; receive, from user input, a selection of an available digital voucher within the digital voucher listing responsive to the presentation of the digital voucher listing; transmit, using the proximity communication interface, the available digital voucher to the digital voucher enabled merchant system; receive updated transaction data from the digital voucher enabled merchant system; and instruct the display to present a digital voucher transaction summary.

Additionally or alternatively, the instructions, when executed, may further be configured to cause the processor to: obtain a new voucher message via the wireless networking interface of the mobile device, the new voucher message indicating that digital vouchers are available from a digital voucher provider, the new voucher message sent responsive to a dispatch command issued by a manager of the digital voucher provider; after receiving the new voucher message, transmit user data, via an RF communication link established using the wireless networking interface, to update a user account associated with an identifier unique to the mobile device; obtain, via the RF communication link, a new digital voucher from the enterprise management system, the new digital voucher assigned to the mobile device according to a distribution criterion met by the user account, store the new digital voucher in the memory among the plurality of digital vouchers by selecting among data structures in the memory, and delete a previously stored voucher that has expired from among the plurality of vouchers. The user data includes: user purchase history data; and user browsing history data. The new digital voucher encoded as a data structure includes: a voucher name field; a voucher type field; a voucher amount field; and a voucher provider field including an indicator of the digital voucher provider. The data structures in the memory include: data structures for digital vouchers that include an image field; and data structures for digital vouchers that do not include an image field.

In an implementation of the digital voucher processing system, the initial transaction data includes an initial transaction amount and the updated transaction data includes an updated transaction amount modified based on the second digital voucher.

In another implementation of the digital voucher processing system, the proximity communication interface includes a near field communication (NFC) interface, and the instructions, when executed, further cause the computer processor to transmit the second digital voucher to the digital voucher enabled merchant system through the NFC interface.

In yet another implementation of the digital voucher processing system, the instructions, when executed, further cause the computer processor to: generate a digital voucher transaction report including information identifying the second digital voucher and identifying the transaction; and transmit the digital voucher transaction report to a digital voucher issuer. In some scenarios, the digital transaction report transmitted to the digital voucher issuer further includes an identification of the second digital voucher enabled mobile device, data indicating a type of good or service subject to the transaction, or data indicating a quantity of good or service subject to the transaction, or any combination thereof.

In another implementation of the digital voucher processing system, the second digital voucher includes a fidelity card that earns a customer points on purchases made from a merchant, and the instructions, when executed, further cause the computer processor to update a points total associated with the customer in response to the transaction.

In yet another implementation of the digital voucher processing system, the second digital voucher includes a restaurant voucher.

Exemplary aspects, features, and components of the system are described above. However, the system may be implemented in many different ways. For example, although some features are shown stored in computer-readable memories (e.g., as logic implemented as computer-executable instructions or as data structures in memory), all or part of the system and its logic and data structures may be stored on, distributed across, or read from other machine-readable media. The media may include hard disks, floppy disks, CD-ROMs, or other media. The logic and data structures may be transmitted in a tangible signal, such as a signal received from a network or received over multiple packets communicated across the network.

The system may be implemented with additional, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the system may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that prepares intermediate mappings or implements a search on the mappings. As another example, the DLL may itself provide all or some of the functionality of the system, tool, or both.

While various embodiments have been described, it will be apparent to those of ordinary skill in the art that many more embodiments and implementations are possible.

What is claimed is:

1. A product, comprising:
    a machine-readable medium other than a transitory signal;
    instructions stored on the machine-readable medium, the instructions configured to at execution cause a processor of a mobile device to:
        obtain a new voucher message via a cellular data interface of the mobile device, the new voucher message indicating that digital vouchers are available from an enterprise system of a digital voucher issuer, the new voucher message sent responsive to a dispatch command issued by a manager of the digital voucher issuer;
        after obtaining the new voucher message:
            obtain, via a hypertext transfer protocol (HTTP) over the cellular communication link, a new digital voucher from the enterprise system, the new digital voucher assigned to the mobile device according to a distribution criterion met by a user account, the distribution criterion based on user purchase history and user browsing history data, parameters for the new digital voucher downloaded while encoded as a HTTP metadata structure comprising:
                a voucher quantity field;
                after the voucher quantity field, a voucher name field;
                after the voucher name field, a voucher type field;
                after the voucher type field, a voucher amount field;
                after the voucher amount field, a voucher provider field comprising
                    an indicator of a service provider for the digital voucher; and
                after the voucher provider field, an image field comprising a reference of an image of the new digital voucher, the reference including a starting byte and an ending byte;
            store the new digital voucher in memory among multiple other digital vouchers also stored in the memory as metadata structures, the metadata structures comprising:
                metadata structures for digital vouchers that include an image field after the voucher provider field; and
            delete a previously stored voucher that has expired from among the multiple other digital vouchers;
        determine, using a near field communication (NFC) interface, that a digital voucher enabled merchant system is within 10 centimeters of the NFC interface; and
        in response to the determination that the digital voucher enabled merchant system is within 10 centimeters of the NFC interface, receive, via the NFC interface, initial transaction data for a transaction from the digital voucher enabled merchant system, the initial transaction data including:
            a merchant identifier for the digital voucher enabled merchant system;
            transaction type information; and
            an initial transaction amount;
        without requesting user input, compare the data structure to the initial transaction data by comparing:
            the voucher type field of the data structure to the transaction type information; and
            the voucher provider field of the data structure to the merchant identifier;
        responsive to comparing data structure to the initial transaction data, determine that the new digital voucher is irrelevant to the transaction;
        responsive determining the new digital voucher is irrelevant, omit the new digital voucher from a digital voucher listing of digital vouchers relevant to the transaction;
        before completing the transaction, instruct a display of the mobile device to present the digital voucher listing with the new digital voucher omitted;
        receive, from user input, a selection of an available digital voucher within the digital voucher listing responsive to the presentation of the digital voucher listing;
        transmit, to the digital voucher enabled merchant system using the NFC interface, a response to the initial transaction data, the response including:
            the available digital voucher;
            a name of the user; and
            a mobile station international subscriber directory number (MSISDN) for the mobile device;
        after transmitting the response, receive updated transaction data from the digital voucher enabled merchant system, the updated transaction data comprising an updated transaction amount modified with respect to the initial transaction amount based on the available digital voucher;

responsive to the updated transaction data, instruct the display to present a digital voucher transaction summary;
generate a digital voucher transaction report including:
an identifier for the available digital voucher; and
a transaction identifier;
the MSISDN for the mobile device; and
data indicating a type of good or service subject to the transaction; and
transmit the digital voucher transaction report to the enterprise system using the cellular data interface.

2. The product of claim 1, where the available digital voucher comprises a restaurant voucher.

3. The product of claim 1, where:
the available digital voucher comprises a fidelity card that earns a customer points on purchases made from a merchant; and
the instructions are further configured to update a points total associated with the user in response to the transaction.

4. A method, comprising:
obtaining a new voucher message via a cellular data interface of a mobile device, the new voucher message indicating that digital vouchers are available from an enterprise system of a digital voucher issuer, the new voucher message sent responsive to a dispatch command issued by a manager of the digital voucher issuer;
after obtaining the new voucher message:
obtaining, via a hypertext transfer protocol (HTTP) over the cellular communication link, a new digital voucher from the enterprise system, the new digital voucher assigned to the mobile device according to a distribution criterion met by a user account, the distribution criterion based on user purchase history and user browsing history data, parameters for the new digital voucher downloaded while encoded as a HTTP metadata structure comprising:
a voucher quantity field;
after the voucher quantity field, a voucher name field;
after the voucher name field, a voucher type field;
after the voucher type field, a voucher amount field;
after the voucher amount field, a voucher provider field comprising an indicator of a service provider for the digital voucher; and
after the voucher provider field, an image field comprising a reference of an image of the new digital voucher, the reference including a starting byte and an ending byte;
storing the new digital voucher in memory among multiple other digital vouchers also stored in the memory as metadata structures, the metadata structures comprising:
metadata structures for digital vouchers that include an image field; and
deleting a previously stored voucher that has expired from among the multiple other digital vouchers;
determining, using a near field communication (NFC) interface, whether a digital voucher enabled merchant system is within an NFC range of the NFC interface; and
in response to a determination that the digital voucher enabled merchant system is within the NFC range of the NFC interface, receiving, via the NFC interface, initial transaction data for a transaction from the digital voucher enabled merchant system, the initial transaction data including:
a merchant identifier for the digital voucher enabled merchant system;
transaction type information; and
an initial transaction amount;
without requesting user input, comparing the data structure to the initial transaction data by comparing:
the voucher type field of the data structure to the transaction type information; and
the voucher provider field of the data structure to the merchant identifier;
responsive to comparing data structure to the initial transaction data, determining that the new digital voucher is irrelevant to the transaction;
responsive determining the new digital voucher is irrelevant, omitting the new digital voucher from a digital voucher listing of digital vouchers relevant to the transaction;
before completing the transaction, instructing a display of the mobile device to present the digital voucher listing with the new digital voucher omitted;
receiving, from user input, a selection of an available digital voucher within the digital voucher listing responsive to the presentation of the digital voucher listing;
transmitting, to the digital voucher enabled merchant system using the NFC interface, a response to the initial transaction data, the response including:
the available digital voucher;
a name of the user; and
a mobile station international subscriber directory number (MSISDN) for the mobile device;
after transmitting the response, receiving updated transaction data from the digital voucher enabled merchant system, the updated transaction data comprising an updated transaction amount modified with respect to the initial transaction amount based on the available digital voucher;
responsive to the updated transaction data, instructing the display to present a digital voucher transaction summary;
generating a digital voucher transaction report including:
an identifier for the available digital voucher; and
a transaction identifier;
the MSISDN; and
data indicating a type of good or service subject to the transaction; and
transmitting the digital voucher transaction report to the enterprise system using the cellular data interface.

5. The method of claim 4, where the available digital voucher comprises a restaurant voucher.

6. The method of claim 4, where:
the available digital voucher comprises a fidelity card that earns a customer points on purchases made from a merchant; and
the method further comprises updating a points total associated with the user in response to the transaction.

7. A digital voucher system comprising:
a digital voucher issuer, an enterprise system, a digital voucher enabled merchant system, and a mobile device;
the digital voucher issuer comprising:
a first computer processor; and
a first memory coupled to the first computer processor, the first memory comprising:
instructions that at execution cause the first computer processor to:

obtain a dispatch command from a manager of the digital voucher issuer; and
send the dispatch command to the enterprise system;
the enterprise system comprising
a second computer processor; and
a first cellular data interface;
a second memory coupled to the second computer processor, the second memory comprising:
instructions that at execution cause the second computer processor to:
receive the dispatch command from the manager of the digital voucher issuer;
responsive to the dispatch command, send, over a cellular communication link, a new voucher message indicating that digital vouchers are available from the enterprise system;
assign a new digital voucher to a user account according to a distribution criterion met by the user account, the distribution criterion based on user purchase history and user browsing history data; and
send, via hypertext transfer protocol (HTTP) over the cellular communication link, the new digital voucher to the mobile device;
the digital voucher enabled merchant system comprising:
a first near field communication (NFC) interface;
a third computer processor coupled to the first NFC interface; and
a third memory coupled to the third computer processor, the third memory comprising:
instructions that at execution cause the third computer processor to:
generate initial transaction data for a transaction, the initial transaction data including:
a merchant identifier for the digital voucher enabled merchant system;
transaction type information; and
an initial transaction amount;
receive, from the mobile device, a response to the initial transaction data, the response including:
an available digital voucher;
a name of the user; and
the MSISDN;
after receiving the response, generate updated transaction data by modifying the initial transaction amount based on the available digital voucher; and
transmit the updated transaction over the first NFC interface to the mobile device;
a mobile device, comprising:
a second cellular data interface;
a second NFC interface;
a display;
a third computer processor coupled to the display, second NFC interface, and the second cellular data interface; and
a fourth memory coupled to the fourth computer processor, the fourth memory comprising:
instructions that at execution cause the fourth computer processor to:
receive the new voucher message, via the cellular data interface, from the enterprise system;
after receiving the new voucher message:
transmit user data over the cellular communication link established between the first and second cellular data interfaces;
obtain, via the HTTP over the cellular communication link, the new digital voucher from the enterprise system, parameters for the new digital voucher downloaded while encoded as a HTTP metadata structure comprising:
a voucher quantity field;
after the voucher quantity field, a voucher name field;
after the voucher name field, a voucher type field;
after the voucher type field, a voucher amount field; and
after the voucher amount field, a voucher provider field comprising an indicator of a service provider for the new digital voucher; and
after the voucher provider field, an image field comprising a reference of an image of the new digital voucher, the reference including a starting byte and ending byte;
store the new digital voucher in the fourth memory among multiple other digital vouchers also stored in the fourth memory as metadata structures, the metadata structures comprising:
metadata structures for digital vouchers that include an image field; and
delete a previously stored voucher that has expired from among the multiple other digital vouchers;
determine, using the second NFC interface, that the first NFC interface of the digital voucher enabled merchant system is within 10 centimeters of the second NFC interface; and
in response to the determination that the first NFC interface of the digital voucher enabled merchant system is within 10 centimeters of the second NFC interface, receive, via the second NFC interface, initial transaction data from the first NFC interface of the digital voucher enabled merchant system;
without requesting user input, compare the data structure to the initial transaction data by comparing:
the voucher type field of the data structure to the transaction type information; and
the voucher provider field of the data structure to the merchant identifier;
responsive to comparing data structure to the initial transaction data, determine that the new digital voucher is irrelevant to the transaction;
responsive determining the new digital voucher is irrelevant, omit the new digital voucher from a digital voucher listing of digital vouchers relevant to the transaction;
before completing the transaction, instruct the display to present the digital voucher listing with the new digital voucher omitted;
receive, from user input, a selection of an available digital voucher within the digital voucher listing responsive to the presentation of the digital voucher listing;
transmit, to the digital voucher enabled merchant system using the first NFC interface, the response to the initial transaction data;

after transmitting the response, receive the updated transaction data from the digital voucher enabled merchant system, the updated transaction data comprising an updated transaction amount modified with respect to the initial transaction amount based on the available digital voucher;

responsive to the updated transaction data, instruct the display to present a digital voucher transaction summary;

generate a digital voucher transaction report including:
an identifier for the available digital voucher; and
a transaction identifier;
the MSISDN; and
data indicating a type of good or service subject to the transaction; and transmit the digital voucher transaction report to the enterprise system using the second cellular data interface.

8. The digital voucher system of claim 7, where the available digital voucher comprises a restaurant voucher.

9. The digital voucher system of claim 7, where:
the available digital voucher comprises a fidelity card that earns a customer points on purchases made from a merchant; and
the instructions, when executed, are further configured to update a points total associated with the user in response to the transaction.

* * * * *

UNITED STATES PATENT AND TRADEMARK OFFICE
CERTIFICATE OF CORRECTION

PATENT NO.       : 10,382,910 B2
APPLICATION NO.  : 15/141957
DATED            : August 13, 2019
INVENTOR(S)      : Giovanni D'Angelo et al.

Page 1 of 1

It is certified that error appears in the above-identified patent and that said Letters Patent is hereby corrected as shown below:

On the Title Page

Delete Item [30] "Foreign Application Priority Data" and delete the reference to "Feb. 16, 2009 (EP).....09 425 963"

Signed and Sealed this
First Day of October, 2019

Andrei Iancu
*Director of the United States Patent and Trademark Office*